United States Patent [19]

Janssen et al.

[11] 4,104,221

[45] Aug. 1, 1978

[54] PROCESS FOR MAKING WATER DILUTED ELECTROINSULATION ENAMELS

[75] Inventors: Harald Janssen, Reinbek; Ferdinand Hansch, Wedel, both of Fed. Rep. of Germany

[73] Assignee: Dr. Beck & Co., AG, Hamburg, Fed. Rep. of Germany

[21] Appl. No.: 717,204

[22] Filed: Aug. 24, 1976

[51] Int. Cl.$^2$ ............................................. C08L 77/12
[52] U.S. Cl. .......................... 260/29.2 N; 260/29.2 E; 428/379; 528/291; 528/273; 528/279
[58] Field of Search .................................. 260/29.2 N

[56] References Cited

U.S. PATENT DOCUMENTS

| | | | |
|---|---|---|---|
| 3,709,858 | 1/1973 | Albers et al. | 260/29.2 N |
| 3,966,655 | 6/1976 | Kovacs et al. | 260/29.2 N |
| 4,007,146 | 2/1977 | Ishizuka et al. | 260/29.2 N |
| 4,016,330 | 4/1977 | Laganis | 260/29.2 N |
| 4,018,736 | 4/1977 | Fabian et al. | 260/29.2 N |

*Primary Examiner*—Harold D. Anderson
*Assistant Examiner*—Regenia F. Hughes
*Attorney, Agent, or Firm*—Michael J. Striker

[57] ABSTRACT

Water dilutable electroinsulation enamels are made by reacting a hydroxyl group containing polyesteramide of low acid number with at least one amine in an amount of 5 to 30% by weight relative to the weight of the ester imide whereupon the reaction product is diluted with water until it has the desired viscosity for lacquering purposes.

16 Claims, No Drawings

PROCESS FOR MAKING WATER DILUTED ELECTROINSULATION ENAMELS

BACKGROUND OF THE INVENTION

The present invention relates to a process for making electroinsulation enamels which can be diluted with water.

Electroinsulation lacquers are in wide use as wire enamels for insulating electrical conductors and for instance as immersion lacquers for impregnating coiled wires.

The requirements of the electrical industry regarding heat resistance of the insulating materials have increased consistently during the last few decades. The requirements are particularly high regarding insulation of electrical conductors. The reason is the increasing tendency for miniaturizing of electrical appliances, improving the weight-performance relation in case of electrical machines and the ensueing temperature increase in the coils. Of moment is also that electrical machines are frequently used in plant installations where the atmospheric conditions already involve high temperatures.

As far as can be predicted future increases of the heat resistance will be required in case of wire enamels. A wire enamel type which meets to a large extent the requirements of the electrical industry and in addition has excellent mechanical and electrical properties, is constituted by wires coated with polyesterimide lacquers. These polyesterimide wire lacquers and insulated wires now have been part of the art for more than 10 years; see German published applications No. 1,445,263 and 1,495,100 corresponding to U.S. Pat. No. 3,697,471.

The polyesterimide resin base of these lacquers is made preferably of aromatic tricarboxylic acid monoanhydrides, aromatic dicarboxylic acids or lower dialkylesters thereof and diamines. Preferred among these are aromatic diamines. A further element of the esters are di- and higher functional alcohols.

The solvents for the polyesterimide wire enamels are almost exclusively phenolic materials, preferably isomeric cresol and xylenol mixtures obtained from coalor lignite tar and blended with aromatic hydrocarbons such as solvent naphtha.

The contents of solvents in the polyesterimide wire enamels usually is between 60 and 75% of which about 65% are cresols and xylenols.

A decided disadvantage in using wire lacquers with such high percentages of solvent contents is the problem of the air pollution by these solvents which have a highly obnoxious character.

The law in general now requires that the air pollution by discharge gases be reduced to a minimum and for this purpose expensive steps are necessary for the lacquer application such as various catalysts.

It is furthermore necessary to mention also the highly dangerous character of the cresolic solvents when coming in contact with the skin and of the aromates which are used as blending components in case of inhalation of the vapors. It is particularly this inhalation which often cannot be avoided in industrial practice.

All this shows that a process for insulating electrical conductors with wire enamels which, while preserving the high performance level of the prior art lacquers, do not contain this type of solvents would therefore constitute a definite and urgent contribution to the state of the art.

Apart from the coating of electrical conductors with solvent-free resins from a melt which has already been proposed the use of water as solvent and diluent for polyesterimide resins would be ideal since the apparatus for applying the enamels and various coating appliances could be used without any necessity for structural changes.

This would also solve the problems in regard to air pollution and in regard to the other dangers caused directly by the solvents as discussed above.

The making of water soluble polyesters has already become known from various prior art disclosures. In these cases there is used as excess of carboxylic groups, for instance by concurrent use of tricarboxylic acids, and the polyesters which then contain free carboxylic groups are thereafter neutralized with alkali, that is they are converted to the water soluble salts.

In German application No. 17 20 321 corresponding to British Pat. No. 1,184,139 a process is described for making polyesterimide resins which can be diluted by water. According to that disclosure aromatic tricarboxylic acid anhydrides are first reacted with up to 80% of the stoichiometric amount of primary diamines necessary for the imide formation and are then condensed with an excess of di- or trialcohols. The excess alcohol is then distilled off and the condensation product is heated with a small amount of aqueous ammonia and possibly upon addition of dialcohols to a temperature in excess of 80° C and is subsequently diluted with water. It has, however, been found that the thus-obtained aqueous polyesterimide solution when applied as lacquer to a wire does not maintain the required level of properties as is presently obtained with the conventional polyesterimide wire lacquers.

SUMMARY OF THE INVENTION

Surprisingly, a novel and advantageous process for making water diluted electroinsulation lacquers, in particular wire enamels, from polyesterimides, amines and possibly organic solvents, has now been found.

The wire enamels made by this process have the definite advantage that their general level of properties is equal to the wire lacquers on polyimide base of the prior art which always posed problems as to the environment, while the new lacquers definitely have a high environmental compatability.

The new process for making water dilutable electroinsulation lacquers, particularly wire enamels, on a polyesterimide base proceeds from a polyesterimide which has been made by reaction of aromatic tricarboxylic acid monoanhydrides with preferably equivalent amounts of diamines, diols and triols which latter contain an isocyanurate ring. According to the process of the invention, hydroxyl group containing polyesterimides for instance constituted by the reaction product just described are heated at temperatures between 50° and 250° C with an amine or amines in an amount between 5 and 30% by weight and preferably 20 to 30% by weight relative to the polyesterimide. If desired between 5 and 20% by weight of solvents may be added. The reaction product is then diluted with water to obtain desired lacquering viscosity which is a viscosity between 100 and 10000 mPa s. Water-soluble enameling catalysts, preferably water-soluble titanates may be added in amounts of 0.1 to 5%.

It will be understood that the lacquer viscosity depends on the uncoated wire strength and also the processing conditions. It will also be understood that since the polyesterimides have hydroxyl end groups and very low acid numbers not higher than ten, the conventional approach when making water-soluble resins which consists in the neutralization of the acid groups as particularly known in case of polyesters, cannot be used with these polyesterimides.

DISCUSSION OF THE INVENTION AND OF PREFERRED EMBODIMENTS

The polyesterimides employed in the invention in their general structure are described for instance in the German accepted applications 14 45 263 and 14 95 100 corresponding to U.S. Pat. No. 3,697,471. It was, however, surprising and could not be predicted that the prior art type of polyesterimides could be converted to a water dilutable condition by employing triols which contained an isocyanurate ring.

The resins employed in making heat resistant wire enamels of the invention are made e.g. from the following:

The diol is preferably ethylene glycol. If used, the aromatic dicarboxylic acid is preferably terephthalic acid or dimethylterephthalate or isophthalic acid. The aromatic tricarboxylic acid monoanhydride is preferably a trimellitic acid anhydride. Diamines which can be employed in the polyesterimide resins are preferably, aromatic double ring compounds such as for instance 4,4'-diaminodiphenylmethane or the corresponding oxide.

For use as insulating lacquers in a broader sense, for instance for immersion lacquers or coating lacquers, polyesterimides of higher flexibility and less rigid structure are particularly suited. These imides are for instance those which have been formed by use of aliphatic diamines such as trimethylhexamethylenediamine and may have been modified with aliphatic dicarboxylic acids such as adipic acid.

The operational steps of the making the polyester amides are generally as described in the cited publications and may consist in a melt condensation or solvent condensation.

Particularly useful is the condensation process described in German published application 14 95 182 corresponding to U.S. Pat. No. 3,852,246, where the condensation is carried out in an excess of ethylene glycol which subsequently is again removed in a vacuum step.

The auxiliary solvents which can be used in the invention are water miscible materials of high solvent power for the polyesterimide resins such as dimethylformamide, dimethylacetamide, dimethylsulfoxide and N-methylpyrrolidone. The amount of solvent usually is between 5 and 20% by weight relative to the weight of the polyesterimide resin.

It is also possible to add conventional flow agents such as alcohols, ether-alcohols and esters in small amounts.

The amines are those which are usually employed when making lacquers which may be diluted by water such as for instance triethylamine, di-n-propylamine, tri-n-propylamine, diisopropylamine, N-ethylbutylamine, N-methylisobutylamine, 1,1-dimethylpropylamine and morpholine.

Preferably, however, aliphatic amino alcohols are used which have a low vapor pressure such as up to a maximum of 50 mm Hg at 20° C and boiling points preferably between 100° and 200° C, such as monoisopropanolamine, dimethylisopropanolamine, 3-dimethylaminopropanol, methyldiisopropanolamine, 2-amino-2-methylpropanol, 2-dimethylaminoethanol, 2-diethylaminoethanol and 2-dimethylamino-2-methylpropanol. The last-mentioned two amines form an azeotropic mixture with water and therefore escape from the lacquer coating already at temperatures of 100° C.

The reaction product between the polyesterimide resin and the amine may be diluted with water to the desired viscosity after adding conventional water soluble enameling catalysts in amounts of 0.1 to 5% by weight relative to the resin. Particularly useful have been in case of conventional polyesterimide wire lacquers titanic acid esters such as tetrabutyltitanium. In addition there is now available a water soluble titanate in the form of triethanolaminotitanate which is particularly suited to be added to the polyesterimide wire lacquers of the present invention.

The following examples will further illustrate the invention:

EXAMPLE 1

The following components were employed to make a polyesterimide resin:
  192 g trimellitic acid anhydride (1.0 mol),
  99 g diaminodiphenylmethane (0.5 mol) and
  97 g dimethylterephthalate (0.5 mol),
  114.8 g trishydroxyethylisocyanurate (0.44 mol) and
  41.5 g ethyleneglycol (0.67 mol)

These components were heated during 3 hours to 200°–250° C while adding 102 g N-methylpyrrolidone and 0.5 g butyltitanate. After cooling the reaction mass to about 175° C, 72 g 2-dimethylamino-2-methylpropanol (80% aqueous solution) ("DMAMP 80") were added. The mixture was refluxed for 1 hour.

After cooling to room temperature the solution was diluted with 793 g of distilled water and further mixed with 30 g"DMAMP 80", 24 g butylglycol and 10 g triethanolaminotitanate.

The clear solution then had a viscosity of 2800 mPa s(1 mPa s = 1cP) at 23° C and a contents of solids at about 30%.

For enameling a specimen was further diluted with distilled water to a solids content of about 28%. The viscosity then was 300 mPa at 23° C. The lacquer was applied in a conventional wire enameling oven of 2.50 m length to a copper wire of 0.5 mm diameter in six passes and was burned in at 500° C. The withdrawal speed of the wire was 8.3 m/min.

The wire then showed the following properties when tested by the standards of DIN 46453 (German norms):
  Diameter increase; 0.025 mm
  Hardness; 3 H
  Softening temperature; 295° C
  Adhesion and extensibility after 25% pretensioning (coiled about a mandrel of 0.5 mm); no cracks
  Heat shock (coiled about a mandrel of 0.5 mm), 30 minutes at 200° C; no cracks

EXAMPLE 2

In this case the following components and amounts were used for making the polyesterimide resin:
  155.2 g dimethylterephthalate (0.8 mol)
  307.2 g trimellitic acid anhydride (1.6 mol)
  156.8 g diaminodiphenylmethane (0.8 mol)
  361.5 g trishydroxyethylisocyanurate (1.385 mol) and
  640.0 g ethyleneglycol After adding 1.0 g of butyltitanate the mass was esterified at temperatures up to 220° C until a clear solution was obtained. The excess ethyleneglycol was then distilled off in a vacuum at 200 to 210° C until the resin in a solution in N-methylpyrrolidone (at a ratio of 1 : 1) had reached a viscosity of 360 mPa at 30° C.

There was then added slowly 160 g "DMAMP 80" at 180° C and the mixture was heated under reflux for 1 hour. After adding 870 g of distilled water the clear, about 50% resin solution had a viscosity of 4490 mPa at 23° C.

For enameling purposes 700 g of this solution were mixed with 250 g of distilled water, 20 g of "DMAMP 80", 17.5 g of butylglycol, and 7.0 g of triethanolaminotitanate. This sample then had a viscosity of 55 mPa s and 23° C and a solids content of about 35% and was used under the same conditions as in Example 1 to coat a copper wire of 0.5 mm diameter.

The enameled wire when tested according to the standard of DIN 46453 had the following properties:
Diameter increase 0.025 mm
Hardness 3 H - 4 H
Softening temperature 310° C
Adhesion and extensibility (coil) formed about an 0.5 mm mandrel after 25% pretensioning); no cracks
Heat shock (coiled about an 0.5 mm mandrel, 30 min. at 220° C); no cracks

EXAMPLE 3

1000 g of a resin composed of:
2.0 mol trimellitic acid anhydride
1.0 mol diaminodiphenylmethane
0.7 mol dimethylterephthalate
1.25 mol trishydroxyethylisocyanurate, and
9.0 mol ethyleneglycol
which had been reacted as described in Example 2 and had a viscosity of 230 mPa measured at a ratio of 1 : 1 in NMP at 30° C, were melted at 180 to 190° C. 100 g "DMAMP 80" were then slowly added and the mixture was refluxed for 2 hours. After cooling to about 100° C another 100 g dimethylformamide, 200 g "DMAMP 80" and 600 g distilled water were added. There was thus formed a 50% solution having a viscosity of 416 mPa at 23° C.

600 g of this resin solution were then used for a lacquering specimen and for this purpose were mixed with 15 g of butylglycol and 6 g of triethanolaminotitanate. The mixture was then diluted with 60 g of distilled water to obtain a viscosity of 150 mPa s (23° C). The solids contents was then about 44%.

The specimen was applied as described in Example 1 to a copper wire of an 0.5 mm diameter by baking.

The wire lacquer when tested according to DIN 46 453 had the following properties:
Diameter increase; 0.032 mm
Hardness; 3H - 4H
Softening Temperature; 305° C
Adhesion and extensibility: coil formed about an 0.5 mm mandrel after 25% pretensioning; no cracks
Heat shock: coiled about an 0.5 mm mandrel, 250° C for 30 min.; no cracks
Breakdown voltage of the twisted wire at room temperature; 5.1 KV

EXAMPLE 4

500 g of a polyesterimide consisting of the following components:
2 mol trimellitic acid anhydride
1 mol diaminodiphenylmethane
1.5 mol dimethylterephthalate
1.3 mol trishydroxyethylisocyanurate and
13.8 mol ethyleneglycol,
which were reacted as described in Example 2 (softening point according to the Durrans method 80° C), was melted and reacted at 175° C with 50 g "DMAMP 80".

The mixture was refluxed for 1 hour and then diluted with 50 g dimethylformamide. Subsequently 809 g distilled water and 20 g of "DMAMP 80" were added which resulted in an about 35% clear solution of a viscosity of 4400 nPa s at 23° C.

500 g of this resin solution were mixed with 150 g distilled water, 17.5 g butylglycol, 30 g dimethylformamide, 25 g "DMAMP 80" and 3.5 g triethanol aminotitanate. The solids contents was then about 25% at a viscosity of 120 mPa at 23° C.

This lacquer solution was then applied by baking to a copper wire of 0.5 mm diameter. The tests of the enamel wire by the standards of DIN 46453 had the following results:
Diameter increase; 0.025 mm
Hardness; 3 H
Softening temperature; 300° C
Coil formed about an 0.5 mm mandrel after 20% pretensioning; no cracks
Heat shock, coiled about 0.5 mm mandrel, 30 min. at 200° C; no cracks The Examples 1 to 4 have illustrated the process of the invention employing a polyesterimide resin which contains trishydroxyethylisocyanurate. The now following Examples 5 and 6 are control experiments with a conventional terephthalate acid polyester and a polyesterimide made without employing trishydroxyethylisocyanurate. It was found that these resins could not be changed to a water soluble state by the steps above indicated.

EXAMPLE 5

300 g of a terephthalic acid polyester resin in a cresol solution as conventional for wire enameling purposes was made by the usual procedures from 2.25 mol terephthalic acid dimethylester, 1.5 mol ethyleneglycol and 1.0 mol glycerine. This resin was subjected to melting and was then reacted at 185° C with 45 g "DMAMP 80". It was thereafter refluxed for 1 hour and subsequently mixed with 30 g dimethylformamide and 225 g distilled water.

No clear solution could be obtained. The mass was quite cloudy and separated into two phases.

EXAMPLE 6

500 g of a polyesterimide resin were formed as described in Example 2 from
2.0 mol trimellitic acid anhydride
1.0 mol diaminodiphenylmethane
1.3 mol dimethylterephthalate
0.8 mol glycerin and
8.6 mol ethyleneglycol.

The resin had a softening point of 80° C. It was then melted and reacted at 185° C with 50 g "DMAMP 80" and refluxed for 2 hours. There were then added 50 g dimethylformamide, 100 g "DMAMP 80" and 300 g distilled water. There was obtained a cloudy solution. The turbidity increased within a few days and could not even be eliminated by adding additional amounts of amine ("DMAMP 80").

The following examples 7 to 11 show the use of different kinds of amines for reaction with the polyimide resin prepared and composed as described in above Example 3. These are therefore modifications of the process of the invention.

EXAMPLE 7

500 g of the polyesterimide resin described in Example 3 were heated together with 50 g dimethylformamide, 26.0 g 3-dimethylaminopropanol and 6.5 g distilled water to 115° to 120° C and were maintained at this temperature for 2 hours. Thereafter 366.0 g distilled water and 51.5 g 3-dimethylaminopropanol were added and the mass was maintained for another hour at 70° C. The viscosity of the solution was then 420 mPa s at 23° C.

800 g of this solution were mixed with 8 g triethanolaminotitanate, 20 g butylglycol and 30 g distilled water. The solution then had a viscosity of 240 mPa and a solids contents of 46.6%. It was applied to a copper wire of a diameter of 0.5 mm. The enamel wire had the following properties:
Diameter increase; 0.035 mm
Hardness; 3 H
Softening temperature; 315° C
Coiled about a mandrel of 0.5 mm after 20% pretensioning; no cracks
Heat shock (coiled about an 0.5 mm mandrel) 30 min. at 200° C; no cracks 500 g of the polyesterimide resin described in Example 3 were heated together with 50 g dimethylformamide, 26.0 g dimethylisopropanolamine and 6.5 g distilled water to 115° C and were maintained at this temperature for 2 hours. 366.0 g distilled water and 51.5 g of dimethylisopropanol amine were then added and the solution was maintained for 1 hour at 70° C. The viscosity of the solution was 435 mPa s at 23° C.

800 g of this solution were mixed with 8 g triethanolaminotitanate, 20 g butylglycol and 40 g distilled water. There was thus formed a solution for enameling purposes with a viscosity of 265 mPa at 23° C and a solids content of 46.0%. The application to a copper wire of 0.5 mm diameter was effected by baking under the usual conditions. The lacquer wire had the following properties:
Diameter increase; 0.033 mm
Hardness; 3 H
Softening temperature; 305° C
Coiled about an 0.5 mm mandrel after 25% pretensioning; no cracks
Heat shock (coiled about an 0.5 mm mandrel) 30 min. at 200° C; no cracks

EXAMPLE 9

500 g of the polyesterimide resin described in Example 3 were reacted with 50 g dimethylformamide, 50 g triethanolamine and 12.5 g distilled water for 2 hours at 140° to 145° C. After cooling of the mass to 105° C 99 g triethanolamine and 288.5 g of distilled water which had been premixed were added. The clear solution had a viscosity of 1575 mPa s at 23° C.

600 g of this solution were mixed for enameling purposes with 6 g triethanolaminotitanate, 15 g butylglycol and 100 g distilled water. The viscosity then was 225 mPa at 23° C and the solids content was 41.6%. With this solution a copper wire was coated which had a diameter of 0.5 mm applying the usual procedure. The enameled wire had the following properties:
Hardness; 4 H
Softening temperature; 290° C
Coiled about 0.5 mm mandrel after 15% pretensioning; no cracks
Heat shock (coiled about 0.5 mm mandrel) 30 min. at 200° C; no cracks

EXAMPLE 10

500 g of the polyesterimide resin described in Example 3 were reacted for 2 hours at 140° to 145° C with 50 g dimethylformamide, 30 g 2-dimethylaminoethanol and 7.5 g distilled water. After cooling to 105° C 59 g of 2-dimethylaminoethanol and 353.5 g of distilled water which had been premixed were added. The viscosity of the resin solution at 23° C was 260 mPas, the solids contents 50%.

700 g of this solution were then mixed with 17.5 g butylglycol and 7.0 g triethanolaminotitanate.

The copper wire of 0.5 mm diameter which had been coated using the conventional methods had the following properties
Hardness; 3 to 4 H
Softening temperature; 310° C
Coiled about 0.5 mm mandrel after 25% pretensioning; no cracks
Heat shock (coiled about 0.5 mm mandrel) 30 min. at 200° C; no cracks

EXAMPLE 11

700 g of the polyimide resin described in Example 3 were reacted with 35.0 g dimethylformamide, 54.6 g 2-diethylaminoethanol and 14.0 g distilled water for 2 hours at 140° to 145° C. After cooling to 100 to 105° C, 109.2 g of 2-diethylaminoethanol and 522.2 g distilled water were added. The viscosity of the solution at 23° C was 380 mPa s at a solids content of 50%.

For enameling purposes 600 g of this resin solution were mixed with 15 g ethyl alcohol, 15 g butyl alcohol, 6 g triethanol aminotitanate and 10 g distilled water. The viscosity at 23° C then was 245 mPa at a solids contents of 47.5%.

The properties of an enamel wire (copper wire of 0.5 mm diameter) coated with this solution were as follows:
Diameter increase; 0.040 mm
Hardness; 3 to 4 H
Softening temperature; 310° C
Coiled about 0.5 mm mandrel after 25% pretensioning; no cracks
Heat shock (coiled about 0.5 mm mandrel) 30 min. at 200° C; no cracks
Breakdown voltage at room temperature; 4.5 to 5.0 KV
Breakdown voltage at 180° C; 4.0 to 4.5 KV
Insulating resistance at room temperature; <1000 MΩKm
Insulation resistance at 180° C; 2 to 5 MΩKm
Insulation resistance after 96 hours at a relative humidity of 93%; <1000 MΩKm

We claim:
1. A process of making electro-insulation enamels which are adapted for water dilution,
the said process comprising reacting an aromatic tricarboxylic acid monoanhydride with about equivalent amounts of a diamine, a difunctional alcohol and a trifunctional alcohol which latter in its structure includes an isocyanurate ring so as to obtain a hydroxyl groups containing polyesterimide of an acid number of at most 10,
and then reacting the said polyesterimide with at least one amine and/or aminoalcohol in an amount of 5 to 30% by weight relative to the weight of the esterimide to effect an aminolysis, whereupon the reaction product is diluted with water until it has the desired viscosity for enameling purposes.

2. The process of claim 1 wherein the dicarboxylic acid or ester is terephthalic acid, dimethylterephthalate or isophthalic acid.

3. The process of claim 2 wherein the polyester imide is the reaction product of trimellitic acid anhydride, diaminodiphenylmethane, dimethylterephthalate, tris(hydroxyethyl)isocyanurate and ethyleneglcyol.

4. The process of claim 1 wherein the said viscosity is between 100 and 10,000 cP.

5. The process of claim 1 wherein the tribasic alcohol is tris(hydroxyethyl)isocyanurate.

6. The process of claim 1 wherein the tricarboxylic acid is trimelliticanhydride.

7. The process of claim 1 wherein the reaction between the polyesterimide resin and the amine is carried out in a solvent for the polyesterimide in an amount of 5 to 20% by weight relative to the weight of the polyesterimide.

8. The process of claim 1 wherein the amine is used in an amount of 20 to 30% by weight relative to the weight of the polyesterimide.

9. The process of claim 1 wherein the amino alcohol has a tertiary amino group, a vapor pressure of not more than 50 mm Hg at 20° C and a boiling point between 100° and 200° C.

10. The process of claim 1 wherein the aminoalcohol is selected from the group consisting of 2-dimethylamino-2-methylpropanol, 2-dimethylaminoethanol, 2-diethylaminoethanol, 3-dimethylaminopropanol and dimethylisopropanolamine.

11. The process of claim 1 wherein a water soluble stoving catalyst is added prior to or during the water dilution of the reaction product in an amount of 0.1 to 5% by weight relative to the weight of the polyesterimide.

12. The process of claim 11 wherein the catalyst is triethanolaminotitanate.

13. The process of claim 1 wherein the polyesterimide resin is first reacted at 140° to 190° C with about a third of the total amine aminoalcohol, the remainder of the amine aminoalcohol being added after cooling of the reaction product to 70 to 100° C while the product is simultaneously or subsequently diluted with water to about 50% concentration.

14. A polyimide base lacquer composition produced by the process of claim 1.

15. The process of claim 1 wherein the diamine is diaminodiphenylmethane.

16. The process of claim 1 wherein the formation of the polyesterimide includes a dicarboxylic acid or ester thereof as a further reactant.

* * * * *